US012591690B2

(12) United States Patent
Philip

(10) Patent No.: US 12,591,690 B2
(45) Date of Patent: Mar. 31, 2026

(54) SYSTEM AND METHOD FOR TESTING NETWORK AND SECURITY DEVICES TO DETECT AND MITIGATE VULNERABILITIES

(71) Applicant: BANK OF AMERICA CORPORATION, Charlotte, NC (US)

(72) Inventor: Charles Philip, Mumbai (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 59 days.

(21) Appl. No.: 18/631,512

(22) Filed: Apr. 10, 2024

(65) Prior Publication Data

US 2025/0322076 A1     Oct. 16, 2025

(51) Int. Cl.
*G06F 21/57*          (2013.01)
*G06F 21/64*          (2013.01)

(52) U.S. Cl.
CPC .......... *G06F 21/577* (2013.01); *G06F 21/645* (2013.01)

(58) Field of Classification Search
CPC .............................. G06F 21/577; G06F 21/645
See application file for complete search history.

(56) References Cited

U.S. PATENT DOCUMENTS

| | | | | |
|---|---|---|---|---|
| 9,882,929 | B1 * | 1/2018 | Ettema ..................... | G06F 21/53 |
| 10,158,677 | B1 * | 12/2018 | DiCorpo .............. | H04L 63/145 |
| 10,243,904 | B1 * | 3/2019 | Wescoe ................. | H04L 51/212 |

| | | | | |
|---|---|---|---|---|
| 2007/0066297 | A1 * | 3/2007 | Heidari-Bateni ....... | H04L 43/00 455/423 |
| 2007/0192865 | A1 * | 8/2007 | Mackin ................... | G06F 21/55 726/24 |
| 2011/0214183 | A1 * | 9/2011 | Fudge ................... | G06F 11/008 726/25 |
| 2012/0311703 | A1 * | 12/2012 | Yanovsky ............. | H04L 51/212 726/22 |
| 2013/0111547 | A1 * | 5/2013 | Kraemer ............. | H04L 63/1433 726/1 |
| 2013/0191919 | A1 * | 7/2013 | Basavapatna ........... | H04L 63/20 726/25 |
| 2016/0088010 | A1 * | 3/2016 | Oliphant ............. | H04L 63/1433 726/23 |
| 2019/0379677 | A1 * | 12/2019 | Zenz ..................... | G06F 21/554 |
| 2020/0204572 | A1 * | 6/2020 | Jeyakumar ........... | H04L 51/212 |

* cited by examiner

*Primary Examiner* — Joseph P Hirl
*Assistant Examiner* — Aayush Aryal
(74) *Attorney, Agent, or Firm* — Moore & Van Allen PLLC; Anoohya Yarlagadda

(57)          ABSTRACT

Embodiments of the present invention provide a system for testing network and security devices to detect and mitigate vulnerabilities. The system is configured for scanning an entity network to identify one or more entity devices associated with an entity, wherein the one or more entity devices comprise at least one of security devices and network devices, identifying one or more rules for the one or more entity devices based on accessing data from one or more data repositories, performing one or more tests on the one or more entity devices based on the one or more rules identified for the one or more entity devices, determining that at least a first entity device of the one or more entity devices does not meet the one or more rules, and performing one or more actions to mitigate vulnerabilities associated with the first entity device not meeting the one or more rules.

20 Claims, 7 Drawing Sheets

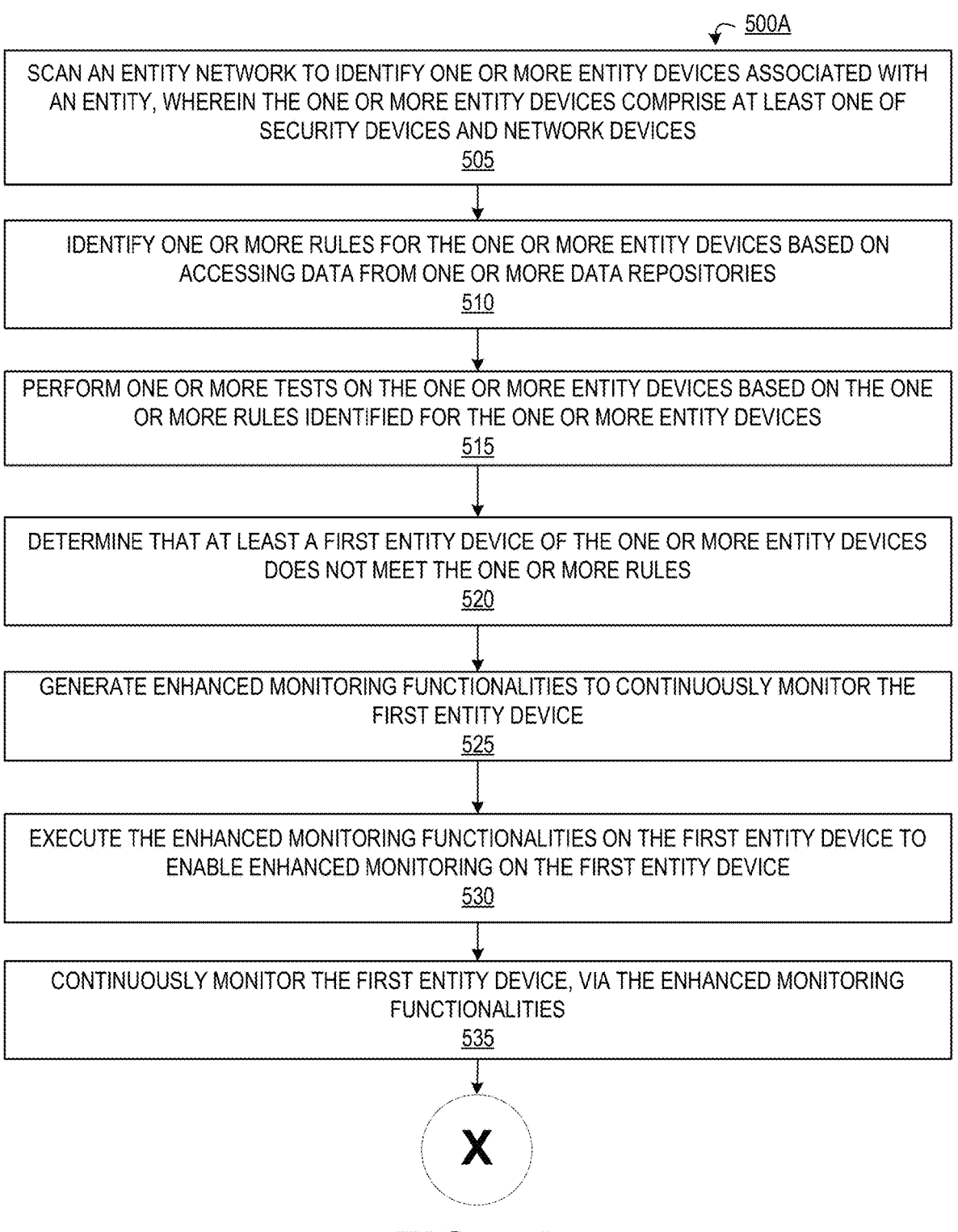

500A

SCAN AN ENTITY NETWORK TO IDENTIFY ONE OR MORE ENTITY DEVICES ASSOCIATED WITH AN ENTITY, WHEREIN THE ONE OR MORE ENTITY DEVICES COMPRISE AT LEAST ONE OF SECURITY DEVICES AND NETWORK DEVICES
505

IDENTIFY ONE OR MORE RULES FOR THE ONE OR MORE ENTITY DEVICES BASED ON ACCESSING DATA FROM ONE OR MORE DATA REPOSITORIES
510

PERFORM ONE OR MORE TESTS ON THE ONE OR MORE ENTITY DEVICES BASED ON THE ONE OR MORE RULES IDENTIFIED FOR THE ONE OR MORE ENTITY DEVICES
515

DETERMINE THAT AT LEAST A FIRST ENTITY DEVICE OF THE ONE OR MORE ENTITY DEVICES DOES NOT MEET THE ONE OR MORE RULES
520

GENERATE ENHANCED MONITORING FUNCTIONALITIES TO CONTINUOUSLY MONITOR THE FIRST ENTITY DEVICE
525

EXECUTE THE ENHANCED MONITORING FUNCTIONALITIES ON THE FIRST ENTITY DEVICE TO ENABLE ENHANCED MONITORING ON THE FIRST ENTITY DEVICE
530

CONTINUOUSLY MONITOR THE FIRST ENTITY DEVICE, VIA THE ENHANCED MONITORING FUNCTIONALITIES
535

SYSTEM AND METHOD FOR TESTING NETWORK AND SECURITY DEVICES TO DETECT AND MITIGATE VULNERABILITIES

BACKGROUND

There exists a need for a system for testing network and security devices to detect and mitigate vulnerabilities.

BRIEF SUMMARY

Embodiments of the present invention address the above needs and/or achieve other advantages by providing apparatuses (e.g., a system, computer program product and/or other devices) and methods for testing network and security devices to detect and mitigate vulnerabilities. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention scans an entity network to identify one or more entity devices associated with an entity, wherein the one or more entity devices comprise at least one of security devices and network devices, identifies one or more rules for the one or more entity devices based on accessing data from one or more data repositories, performs one or more tests on the one or more entity devices based on the one or more rules identified for the one or more entity devices, determines that at least a first entity device of the one or more entity devices does not meet the one or more rules, and performs one or more actions to mitigate vulnerabilities associated with the first entity device not meeting the one or more rules.

In some embodiments, the one or more actions comprise generating enhanced monitoring functionalities to continuously monitor the first entity device, executing the enhanced monitoring functionalities on the first entity device to enable enhanced monitoring on the first entity device, and continuously monitoring the first entity device, via the enhanced monitoring functionalities.

In some embodiments, the present invention monitors the inbound communications and outbound communications of the first entity device based on continuously monitoring the first entity device, via the enhanced monitoring functionalities.

In some embodiments, the present invention controls the inbound communications and the outbound communications of the first entity device based on continuously monitoring the inbound communications and the outbound communications.

In some embodiments, the one or more actions further comprise transmitting information associated with the first entity device not meeting the one or more rules to the one or more third party entities, identifying that the first entity device received one or more controls from the one or more third party entities, wherein the one or more controls are associated with the information transmitted to the one or more third party entities, determining completion of execution of the one or more controls on the first entity device, in response to determining the completion of execution of the one or more controls on the first entity device, reperforming the one or more tests on the first entity device to check for compliance, determining that the one or more tests are successful and that the first entity device meets the one or more rules, and disabling the enhanced monitoring one the first entity device based on determining that the first entity device meets the one or more rules.

In some embodiments, the one or more actions comprise isolating the first entity device from the entity network until the first entity device meets the one or more rules.

In some embodiments, the present invention formulates the one or more rules based on entity policies, vulnerability information, exposure intelligence information, patch information, access information, and active directory information.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
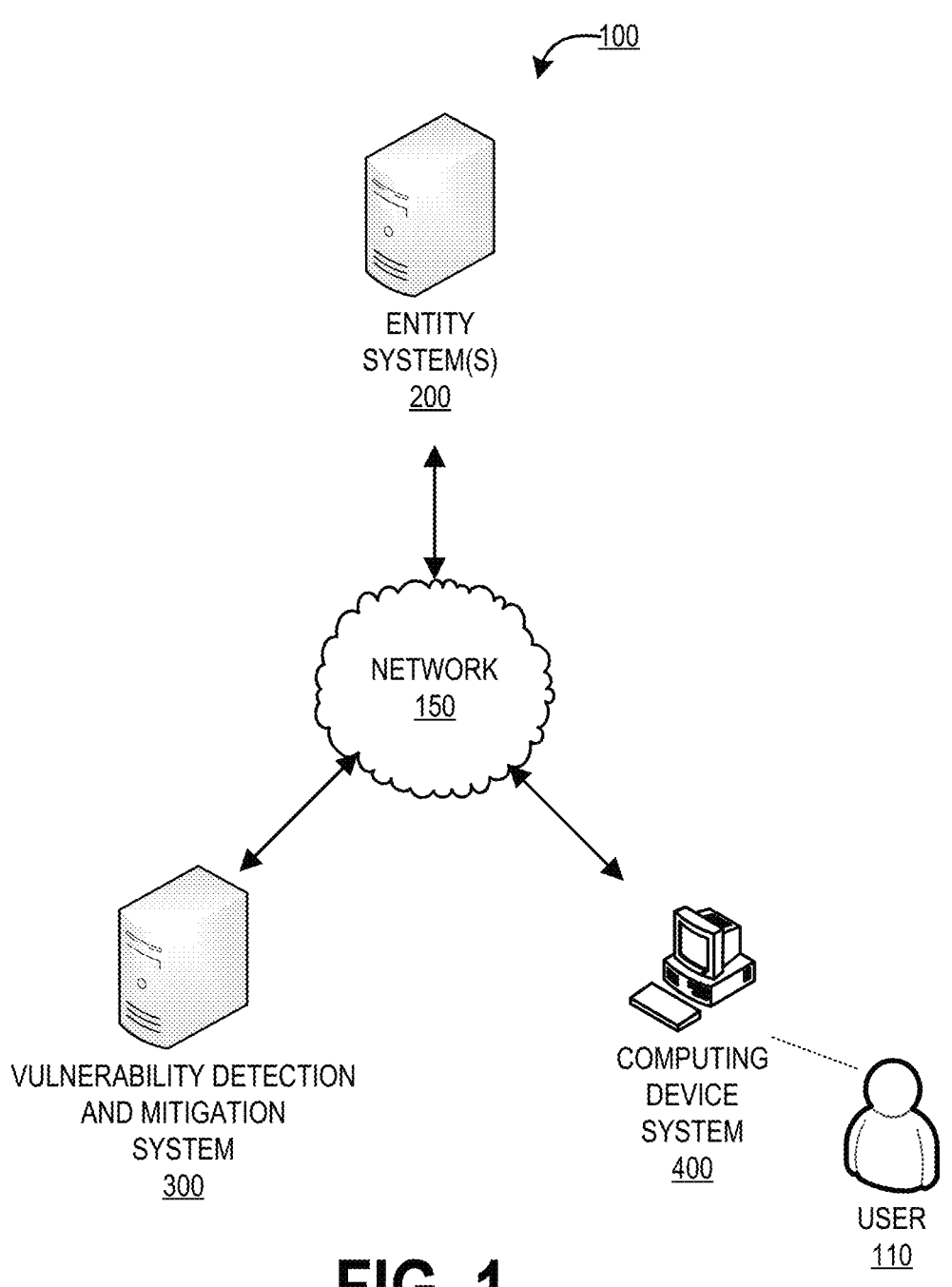
Figure 2:
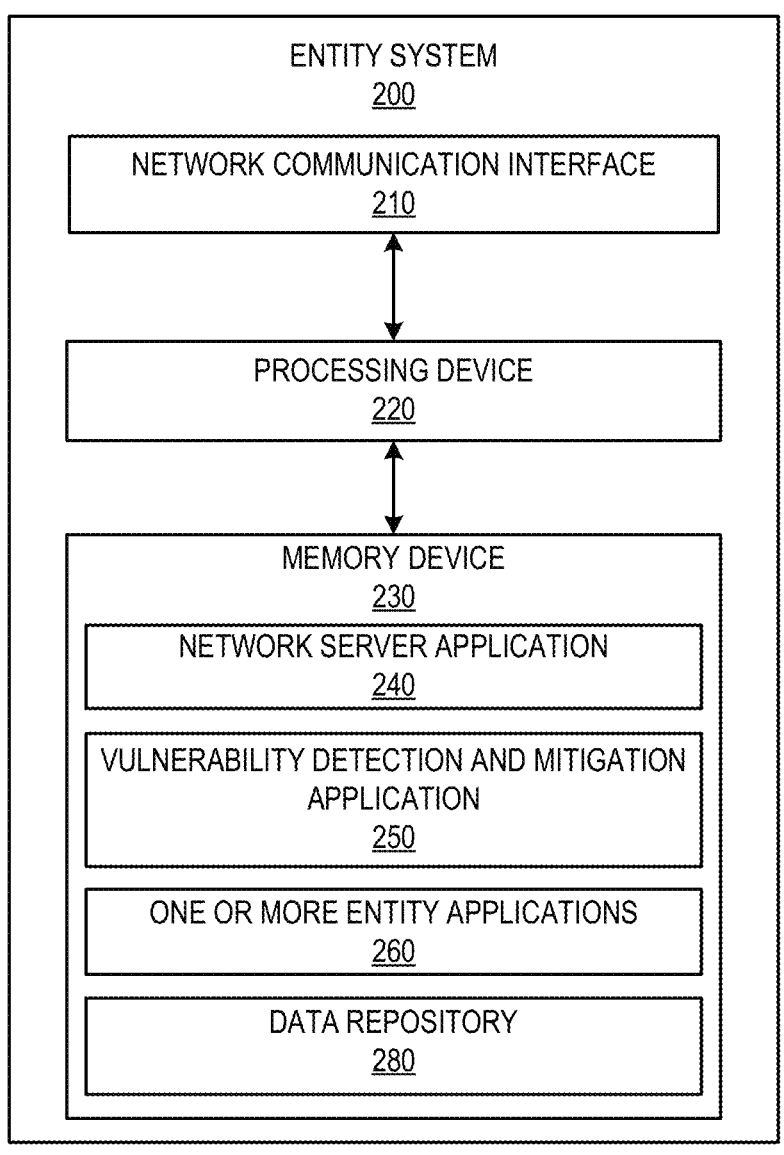
Figure 3:
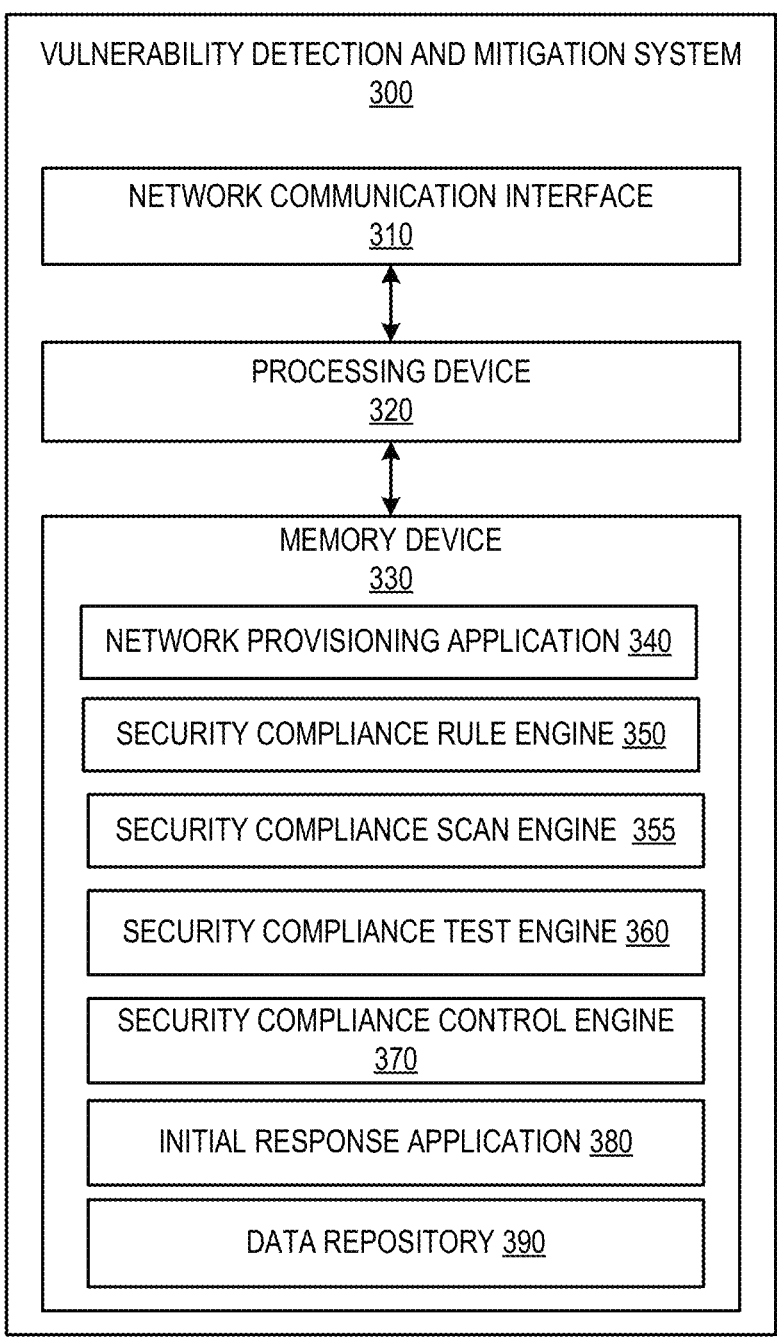
Figure 4:
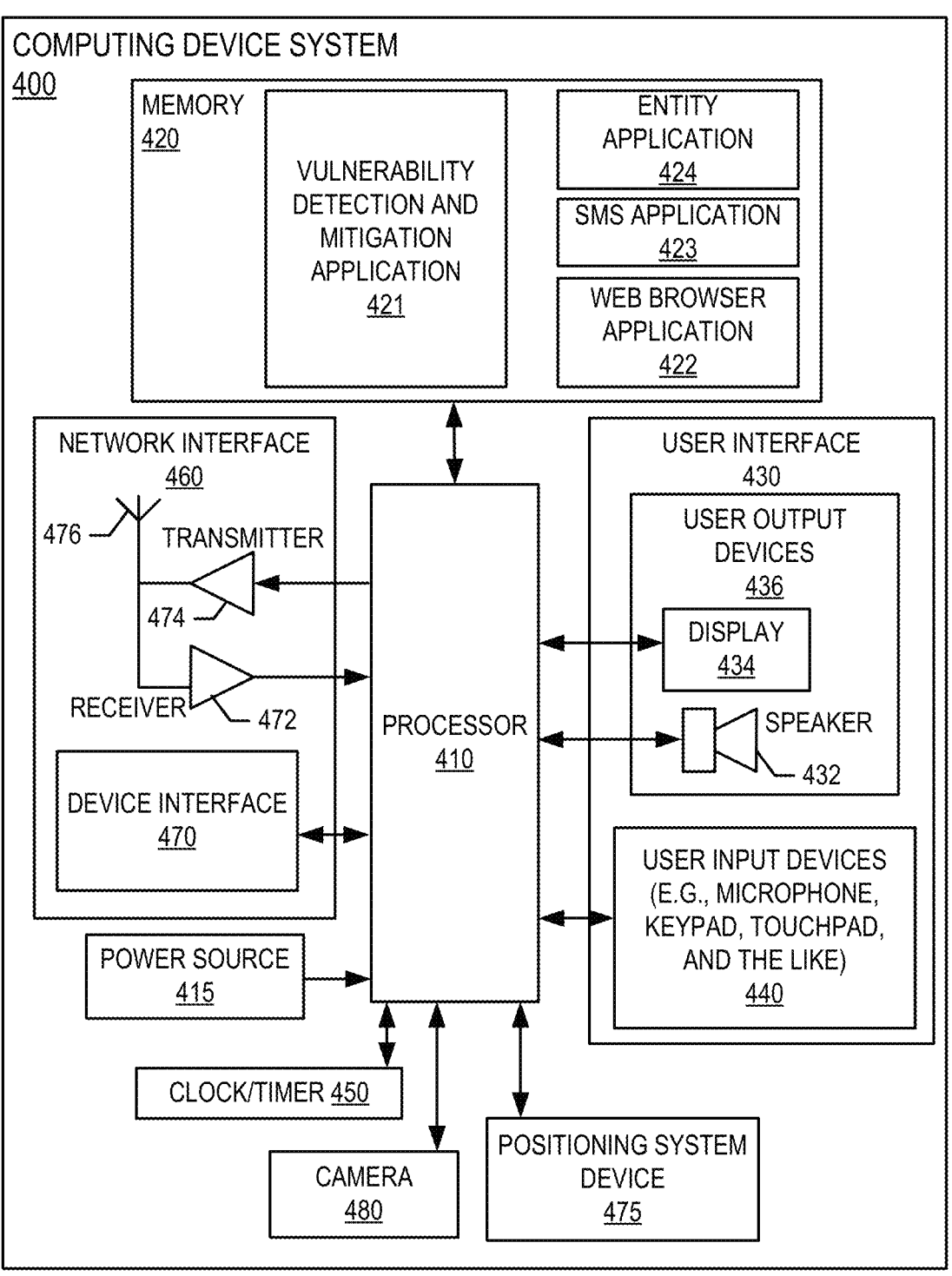
Figure 5B:
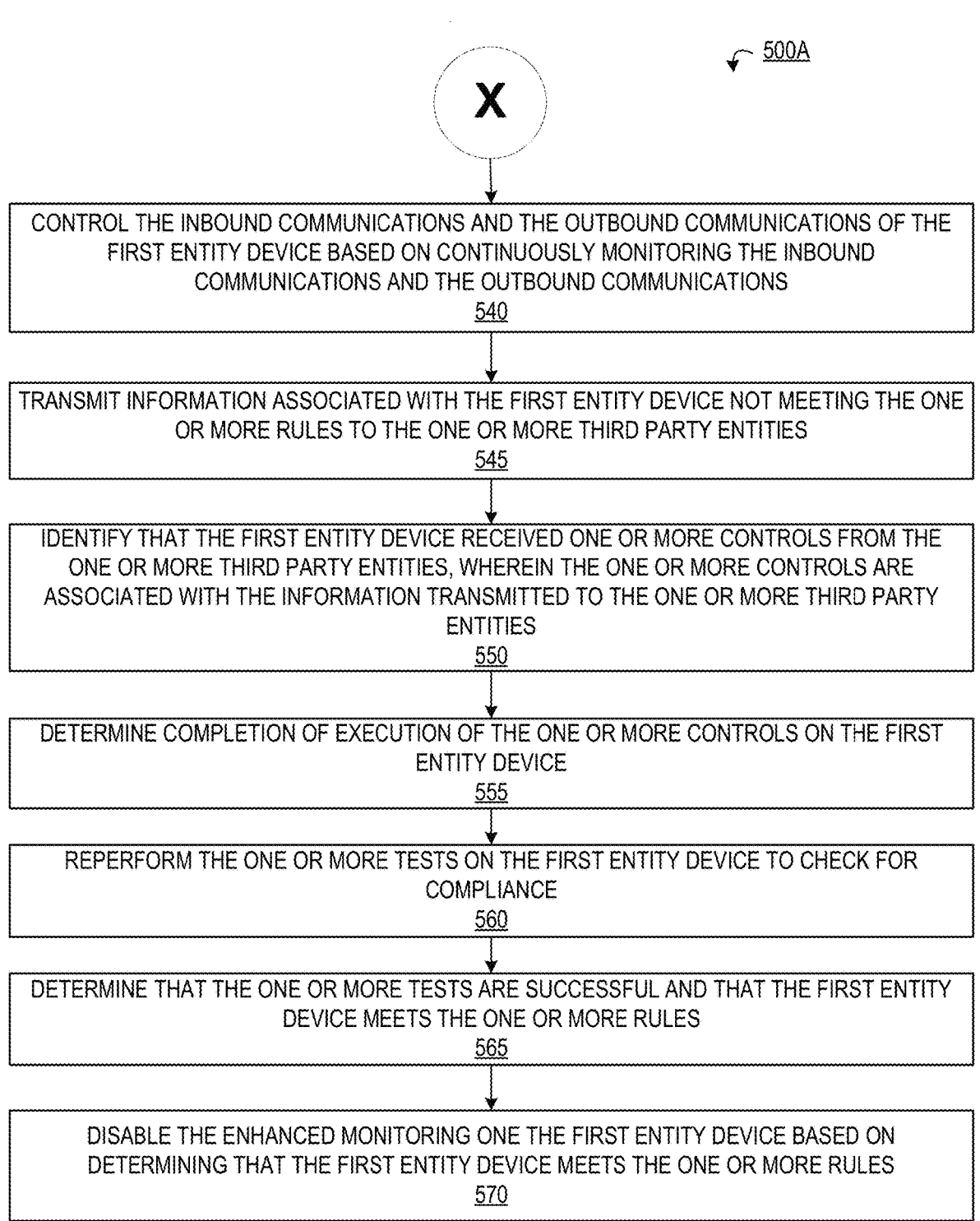
Figure 6:
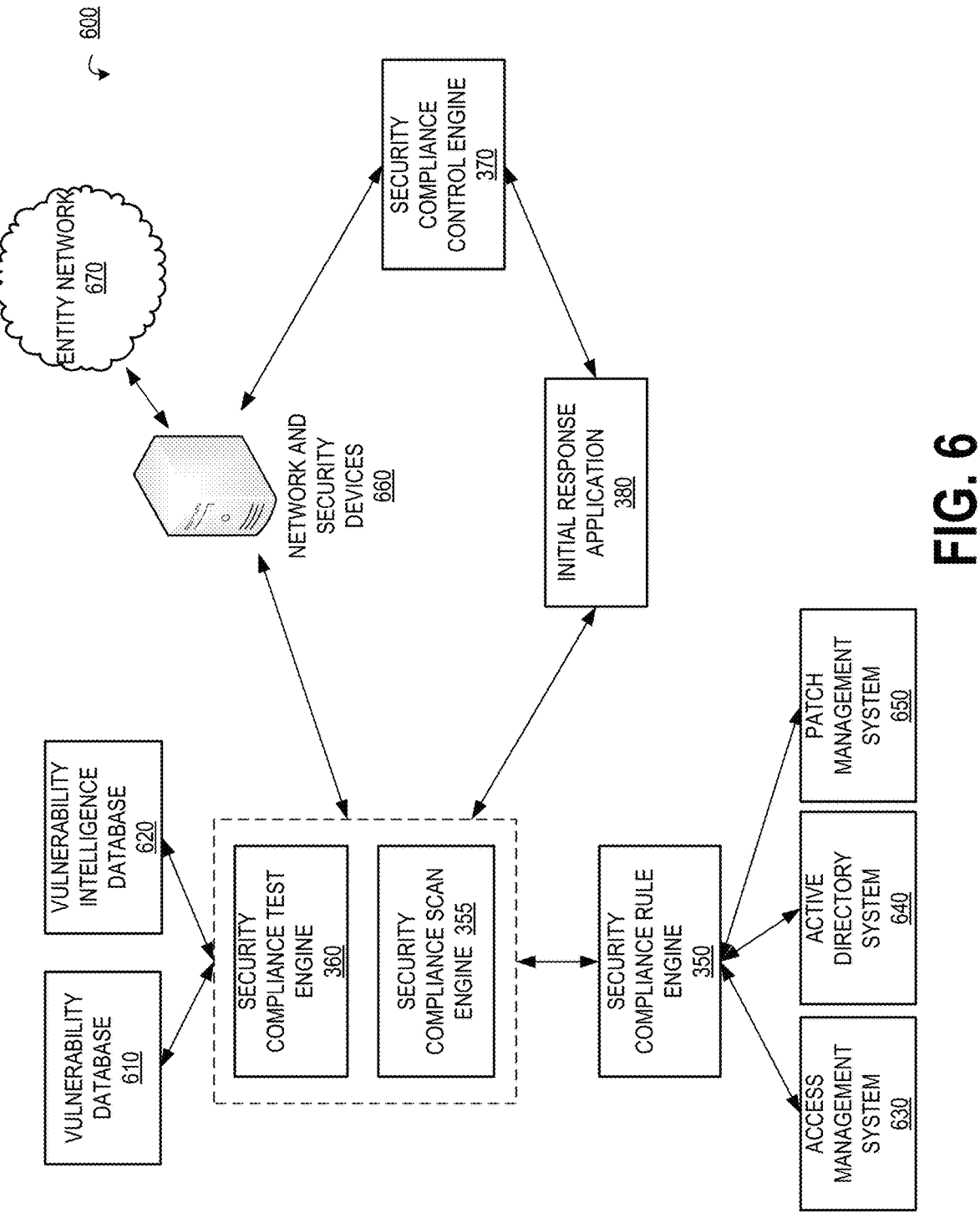

Having thus described embodiments of the invention in general terms, reference will now be made the accompanying drawings, wherein:

FIG. 1 provides a block diagram illustrating a system environment for testing network and security devices to detect and mitigate vulnerabilities, in accordance with an embodiment of the invention;

FIG. 2 provides a block diagram illustrating the entity system 200 of FIG. 1, in accordance with an embodiment of the invention;

FIG. 3 provides a block diagram illustrating a vulnerability detection and mitigation system 300 of FIG. 1, in accordance with an embodiment of the invention;

FIG. 4 provides a block diagram illustrating the computing device system 400 of FIG. 1, in accordance with an embodiment of the invention;

FIGS. 5A and 5B provide a process flow for testing network and security devices to detect and mitigate vulnerabilities, in accordance with an embodiment of the invention; and FIG. 6 provides a block diagram illustrating the process of testing network and security devices to detect and mitigate vulnerabilities, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that utilizes one or more network and security devices (e.g., firewalls, intrusion detection systems, antivirus, VPN gateways, network monitoring tools, proxy servers, and/or the like) to perform one or more activities. In some embodiments, the entity may be a financial institution which may include any financial institutions such as commercial banks, thrifts, federal and state savings banks, savings and loan associations, credit unions, investment companies, insurance companies and the like. In some embodiments, the entity may be a non-financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications, systems, servers, and/or devices provided by the entity and/or the system of the present invention. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Typically, third party entity devices may be part of an entity network associated with an entity, where the third party entity devices may assist one or more entity systems to perform and/or complete one or more entity related operations (e.g., network related operations, security related operations, processing related operations, and/or the like). However, the third party entity devices may be operated and maintained by third party entities and the entity may have limited or no control over the third party entity devices (e.g., third party proprietary devices). When exposures that may affect the third party entity devices are identified, the entity may have to wait until the third party entities update the third party entity devices, thereby increasing the chance of exposing other systems of the entity network to the exposure and impacts associated with the exposure. As such, there exists a need for a system to continuously test the third party entity devices to detect vulnerabilities and take one or more actions to mitigate the impacts associated with the exposures. The system of the invention solves this problem as discussed in detail below.

FIG. 1 provides a block diagram illustrating a system environment 100 for testing network and security devices to detect and mitigate vulnerabilities, in accordance with an embodiment of the invention. As illustrated in FIG. 1, the environment 100 includes a vulnerability detection and mitigation system 300, entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees of an entity associated with the entity system 200 (e.g., software engineer, application developer, application tester, and/or the like).

The entity system(s) 200 may be any system owned or otherwise controlled by an entity to support or perform one or more process steps described herein. In some embodiments, the entity is a financial institution. In some embodiments, the entity is a non-financial institution.

The vulnerability detection and mitigation system 300 is a system of the present invention for performing one or more process steps described herein. In some embodiments, the vulnerability detection and mitigation system 300 may be an independent system. In some embodiments, the vulnerability detection and mitigation system 300 may be a part of the entity system 200.

The vulnerability detection and mitigation system 300, the entity system 200, and/or the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the vulnerability detection and mitigation system 300 is configured to communicate information or instructions with the entity system 200, and/or the computing device system 400 across the network 150.

The computing device system 400 may be a computing device of the user 110. In general, the computing device system 400 communicates with the user 110 via a user interface of the computing device system 400, and in turn is configured to communicate information or instructions with the vulnerability detection and mitigation system 300 and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by an entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to perform data processing operations and to operate the network communication interface 210 to perform certain communication functions of the entity system 200 described herein. For example, in one embodiment of the entity system 200, the memory device 230 includes, but is not limited to, a network server application 240, a vulnerability detection and mitigation application 250, one or more entity applications 260, and a data repository 280. The computer-executable program code of the network server application 240, the vulnerability detection and mitigation application 250, and the one or more entity applications 260 to perform certain logic, data-extraction, and data-storing functions of the entity system 200 described herein, as well as communication functions of the entity system 200.

The network server application 240, the vulnerability detection and mitigation application 250, and the one or more entity applications 260 are configured to store data in the data repository 280 or to use the data stored in the data repository 280 when communicating through the network communication interface 210 with the vulnerability detection and mitigation system 300, and the computing device system 400 to perform one or more process steps described herein. In some embodiments, the entity system 200 may receive instructions from the vulnerability detection and mitigation system 300 via the vulnerability detection and mitigation application 250 to perform certain operations. The vulnerability detection and mitigation application 250 may be provided by the vulnerability detection and mitigation system 300.

FIG. 3 provides a block diagram illustrating the vulnerability detection and mitigation system 300 in greater detail, in accordance with embodiments of the invention. As illustrated in FIG. 3, in one embodiment of the invention, the vulnerability detection and mitigation system 300 includes one or more processing devices 320 operatively coupled to a network communication interface 310 and a memory device 330. In certain embodiments, the vulnerability detection and mitigation system 300 is operated by an entity, such as a financial institution, while in other embodiments, the vulnerability detection and mitigation system 300 is operated by an entity other than a financial institution. In some embodiments, the vulnerability detection and mitigation system 300 is owned or operated by the entity of the entity system 200. In some embodiments, the vulnerability detection and mitigation system 300 may be an independent system. In alternate embodiments, the vulnerability detection and mitigation system 300 may be a part of the entity system 200.

It should be understood that the memory device 330 may include one or more databases or other data structures/repositories. The memory device 330 also includes computer-executable program code that instructs the processing device 320 to perform one or more data processing operations described herein and to operate the network communication interface 310 to perform certain communication functions of the vulnerability detection and mitigation system 300 described herein. For example, in one embodiment of the vulnerability detection and mitigation system 300, the memory device 330 includes, but is not limited to, a network provisioning application 340, a security compliance rule engine 350, a security compliance scan engine 355, a security compliance test engine 360, a security compliance control engine 370, an initial response application 380, and a data repository 390 comprising data processed or accessed by one or more applications in the memory device 330. The computer-executable program code of the network provisioning application 340, the security compliance rule engine 350, the security compliance scan engine 355, the security compliance test engine 360, the security compliance control engine 370, and the initial response application 380 may instruct the processing device 320 to perform certain logic, data-processing, and data-storing functions of the vulnerability detection and mitigation system 300 described herein, as well as communication functions of the vulnerability detection and mitigation system 300.

The network provisioning application 340, the security compliance rule engine 350, the security compliance scan engine 355, the security compliance test engine 360, and the security compliance control engine 370 are configured to invoke or use the data in the data repository 390 when communicating through the network communication interface 310 with the entity system 200, and the computing device system 400. In some embodiments, the network provisioning application 340, the security compliance rule engine 350, the security compliance scan engine 355, the security compliance test engine 360, the security compliance control engine 370, and the initial response application 380 may store the data extracted or received from the entity system 200 and the computing device system 400 in the data repository 390. In some embodiments, the network provisioning application 340, the security compliance rule engine 350, the security compliance scan engine 355, the security compliance test engine 360, the security compliance control engine 370, and the initial response application 380 may be a part of a single application. One or more processes performed by the network provisioning application 340, the security compliance rule engine 350, the security compliance scan engine 355, the security compliance test engine 360, the security compliance control engine 370, and the initial response application 380 are described in detail below.

FIG. 4 provides a block diagram illustrating a computing device system 400 of FIG. 1 in more detail, in accordance with embodiments of the invention. However, it should be understood that the computing device system 400 is merely illustrative of one type of computing device system that may benefit from, employ, or otherwise be involved with embodiments of the present invention and, therefore, should not be taken to limit the scope of embodiments of the present invention. The computing devices may include any one of portable digital assistants (PDAs), pagers, mobile televisions, mobile phone, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 150. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110 may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a vulnerability detection and mitigation application 421, an entity application 424, or the like. These applications also typically instructions to a graphical user interface (GUI) on the display 430 that allows the user 110 to interact with the entity system 200, the vulnerability detection and mitigation system 300, and/or other devices or systems. The memory 420 of the computing device system 400 may comprise a Short Message Service (SMS) application 423 configured to send, receive, and store data, information, communications, alerts, and the like via the wireless network 150.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIGS. 5A and 5B provide a process flow for testing network and security devices to detect and mitigate vulnerabilities, in accordance with an embodiment of the invention. As shown in block 505, the system scans an entity network to identify one or more entity devices associated with an entity, wherein the one or more entity devices comprise at least one of security devices and network devices. The security devices and the network devices may comprise firewalls, antivirus, intrusion detection systems, unified threat management systems, network load balancers, network access control devices, wireless intrusion prevention and detection systems, web filters, spam filters, VPN gateways, email security gateways, proxy servers, content filtering devices, network device backup and recovery systems, and/or the like. In some embodiments, some of the one or more entity devices may be owned, provided, operated, maintained, and/or controlled by third party entities, where the one or more entity devices may assist the entity in performing one or more entity related operations and may be integrated with entity owned systems associated with the entity. Typically new devices may be added to the entity network, where other devices connected to the entity network may not be notified about the newly added devices. In some embodiments, the system may continuously scan the entity network to identify all of the one or more entity devices connected to the entity network. In some embodiments, the system may scan the entity network at predefined intervals.

As shown in block 510, the system identifies one or more rules for the one or more entity devices based on accessing data from one or more data repositories. The one or more rules may define one or more controls and/or security measures that the one or more entity devices should have to function properly and to be a part of the entity network. Each of the one or more entity devices may have different rules. In some embodiments, the system may formulate the one or more rules based on communicating with other entity systems, internal data repositories, external data repositories, third party entity systems, and/or the like. Formulating the one or more rules may be based on entity policies, vulnerability information, exposure intelligence information, patch information, access information, and active directory information.

As shown in block 515, the system performs one or more tests on the one or more entity devices based on the one or more rules identified for the one or more entity devices. The one or more tests may be based on the one or more rules formulated by the system in block 510. The system may perform different tests on each of the one or more entity devices. The system may perform one or more tests based on executable portions of code created based on one or more test cases. In some embodiments, the system may automatically generate the executable portions of code associated with test cases based on historical test data. In some embodiments, the system may generate the executable portions of code associated with test codes based on input from one or more users (e.g., users 110). Examples of the one or more tests may include, but are not limited to, missing Content-Security-Policy (CSP), insecure Content-Security-Policy (CSP), missing HTTP Strict-Transport-Security header, local data cache, presence of X-AspNet-Version Header, and/or the like.

As shown in block 520, the system determines that at least a first entity device of the one or more entity devices does not meet the one or more rules. The system may determine that the first entity device has failed at least one of the one or more tests and may determine that the first entity device does not meet the one or more rules. In some embodiments, the failed tests may be related to security threats.

As shown in block 525, the system generates enhanced monitoring functionalities to continuously monitor the first entity device. Enhanced monitoring functionalities may comprise functionalities associated with extensive monitoring of operations (e.g., data processing, network communications, and/or the like) performed by the first entity device. In some embodiments, the system may instantaneously generate the enhanced monitoring functionalities based on device specifications of the first entity device. The system may generate different enhanced monitoring functionalities for different entity devices that do not meet the one or more rules. In some embodiments, the system may generate enhanced monitoring functionalities upon identification of new security threats without performing the steps described in blocks 505 through 520.

As shown in block 530, the system executes the enhanced monitoring functionalities on the first entity device to enable enhanced monitoring on the first entity device. As shown in block 535, the system continuously monitors the first entity device, via the enhanced monitoring functionalities. As shown in block 540, the system controls the inbound communications and the outbound communications of the first entity device based on continuously monitoring the inbound communications and the outbound communications. For example, the system may block one or more of the inbound communications and/or the outbound communications, where these communications may be with internal entity systems or external third party systems. In some embodiments, the system may restrict the first entity device to perform any read or write operations on other systems and/or data repositories connected to the entity network. In some embodiments, the system may isolate the first entity device from the entity network. In some such embodiments, the system may create a standalone private network for the first entity device.

As shown in block 545, the system transmits information associated with the first entity device not meeting the one or more rules to the one or more third party entities. In some embodiments, the system may perform this step in parallel with the step described in block 525. The system may transmit information with the failed tests of the one or more tests to the one or more third party entities associated with the first entity device, where the first entity device may be owned, managed, maintained, controlled, operated, and/or the like by the one or more third party entities.

As shown in block 550, the system identifies that the first entity device received one or more controls from the one or more third party entities, wherein the one or more controls are associated with the information transmitted to the one or more third party entities. Upon availability of a new patch for the failed one or more tests (e.g., security upgrade, software upgrade, operating system upgrade, etc.), the one or more third party entity systems may update the first entity device with the new patch. As shown in block 555, the system determines completion of execution of the one or more controls on the first entity device. In some embodiments, the system may receive a notification from the first entity device and/or the one or more third party entities that the one or more controls are executed on the first entry device.

As shown in block 560, the system reperforms the one or more tests on the first entity device to check for compliance. In some embodiments, the system may rerun only the failed tests on the first entity device. As shown in block 565, the system determines that the one or more tests are successful and that the first entity device meets the one or more rules. As shown in block 570, the system disables the enhanced monitoring one the first entity device based on determining that the first entity device meets the one or more rules.

FIG. 6 provides a block diagram illustrating the process of testing network and security devices to detect and mitigate vulnerabilities, in accordance with an embodiment of the invention. As shown, the security compliance scan engine may scan an entity network 670 to identify one or more network and security devices 660 connected to the entity network 670. In some embodiments, the one or more network and security devices 660 may be part of the entity systems 200. In some embodiments, the entity network 670 may be different from the network 150 shown in FIG. 1. In some embodiments, the entity network 670 may be a part of the network 150 shown in FIG. 1. The security compliance rule engine 350 may communicate with an access management system 630 comprising information associated with access controls associated with the one or more network and security devices 660, an active directory system 640 that comprises information associated with authorization, authentication, and/or the like associated with the one or more network and security devices 660, and a patch management system 650 that manages and comprises information associated with one or more patches for the one or more rules or one or more vulnerabilities identified for the one or more network and security devices 660. In some embodiments, the access management system 630, the active directory system 640, and the patch management system 650 may be part of the entity systems 200. The security compliance test engine 360 may perform one or more tests on the one or more network and security devices 660, where the one or more tests may be based on the one or more rules formulated by the security compliance rule engine 350. Upon identification of failure of at least one of the one or more tests, the initial response application 380 may perform one or more actions comprising at least one of initiating communication with the one or more third party entities that are associated with at least one of the one or more network and security devices 660 that have failed the one or more tests, isolating the least one of the one or more network and security devices 660 that have failed the one or more tests from the entity network 670, and other actions described herein. The security compliance control engine 370 may monitor and/or manage the one or more controls that are being implemented on the one or more network and security devices 660. In some embodiments, the security compliance control engine 370 and/or the initial response application 380 may generate and implement the enhanced monitoring functionalities until the one or more third party entities upgrade the at least one of the one or more network and security devices 660 that have failed the one or more tests.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for testing network and security devices to detect and mitigate vulnerabilities, comprising:
   at least one processing device;
   at least one memory device; and
   a module stored in the at least one memory device comprising executable instructions that when executed by the at least one processing device, cause the at least one processing device to:
      scan an entity network to identify one or more entity devices associated with an entity, wherein the one or more entity devices comprise security devices and network devices, wherein the security devices and the network devices comprise firewalls, antivirus, intrusion detection systems, unified threat management systems, network load balancers, network access control devices, wireless intrusion prevention and detection systems, web filters, spam filters, VPN gateways, email security gateways, proxy servers, content filtering devices, and network device backup and recovery systems;
      identify one or more rules for the one or more entity devices based on accessing data from one or more data repositories, wherein the one or more rules define one or more controls and security measures that the one or more entity devices require to function and to be a part of the entity network;
      automatically generate one or more tests comprising executable portions of code based on the one or more rules;
      perform the one or more tests on the one or more entity devices based on the one or more rules identified for the one or more entity devices;

determine that at least a first entity device of the one or more entity devices does not meet the one or more rules; and
      perform one or more actions to mitigate vulnerabilities associated with the first entity device not meeting the one or more rules.

2. The system according to claim 1, wherein the one or more actions comprise:
   generating enhanced monitoring functionalities to continuously monitor the first entity device;
   executing the enhanced monitoring functionalities on the first entity device to enable enhanced monitoring on the first entity device; and
   continuously monitoring the first entity device, via the enhanced monitoring functionalities.

3. The system according to claim 2, wherein the executable instructions cause the at least one processing device to monitor inbound communications and outbound communications of the first entity device based on continuously monitoring the first entity device, via the enhanced monitoring functionalities.

4. The system according to claim 3, wherein the executable instructions cause the at least one processing device to control the inbound communications and the outbound communications of the first entity device based on continuously monitoring the inbound communications and the outbound communications.

5. The system according to claim 2, wherein the one or more actions further comprise:
   transmitting information associated with the first entity device not meeting the one or more rules to the one or more third party entities;
   identifying that the first entity device received one or more controls from the one or more third party entities, wherein the one or more controls are associated with the information transmitted to the one or more third party entities;
   determining completion of execution of the one or more controls on the first entity device;
   in response to determining the completion of execution of the one or more controls on the first entity device, reperforming the one or more tests on the first entity device to check for compliance;
   determining that the one or more tests are successful and that the first entity device meets the one or more rules; and
   disabling the enhanced monitoring one the first entity device based on determining that the first entity device meets the one or more rules.

6. The system according to claim 1, wherein the one or more actions comprise isolating the first entity device from the entity network until the first entity device meets the one or more rules.

7. The system according to claim 1, wherein the executable instructions cause the at least one processing device to formulate the one or more rules based on entity policies, vulnerability information, exposure intelligence information, patch information, access information, and active directory information.

8. A computer program product for testing network and security devices to detect and mitigate vulnerabilities, comprising a non-transitory computer-readable storage medium having computer-executable instructions for:
   scanning an entity network to identify one or more entity devices associated with an entity, wherein the one or more entity devices comprise of security devices and network devices, wherein the security devices and the network devices comprise firewalls, antivirus, intrusion detection systems, unified threat management systems, network load balancers, network access control devices, wireless intrusion prevention and detection systems, web filters, spam filters, VPN gateways, email security gateways, proxy servers, content filtering devices, and network device backup and recovery systems;

identifying one or more rules for the one or more entity devices based on accessing data from one or more data repositories, wherein the one or more rules define one or more controls and security measures that the one or more entity devices require to function and to be a part of the entity network;

automatically generating one or more tests comprising executable portions of code based on the one or more rules;

performing the one or more tests on the one or more entity devices based on the one or more rules identified for the one or more entity devices;

determining that at least a first entity device of the one or more entity devices does not meet the one or more rules; and performing one or more actions to mitigate vulnerabilities associated with the first entity device not meeting the one or more rules.

9. The computer program product according to claim 8, wherein the one or more actions comprise:

generating enhanced monitoring functionalities to continuously monitor the first entity device;

executing the enhanced monitoring functionalities on the first entity device to enable enhanced monitoring on the first entity device; and continuously monitoring the first entity device, via the enhanced monitoring functionalities.

10. The computer program product according to claim 9, wherein the non-transitory computer-readable storage medium comprises computer-executable instructions for monitoring inbound communications and outbound communications of the first entity device based on continuously monitoring the first entity device, via the enhanced monitoring functionalities.

11. The computer program product according to claim 10, wherein the non-transitory computer-readable storage medium comprises computer-executable instructions for controlling the inbound communications and the outbound communications of the first entity device based on continuously monitoring the inbound communications and the outbound communications.

12. The computer program product according to claim 9, wherein the one or more actions further comprise:

transmitting information associated with the first entity device not meeting the one or more rules to the one or more third party entities;

identifying that the first entity device received one or more controls from the one or more third party entities, wherein the one or more controls are associated with the information transmitted to the one or more third party entities;

determining completion of execution of the one or more controls on the first entity device;

in response to determining the completion of execution of the one or more controls on the first entity device, reperforming the one or more tests on the first entity device to check for compliance;

16 determining that the one or more tests are successful and that the first entity device meets the one or more rules; and disabling the enhanced monitoring one the first entity device based on determining that the first entity device meets the one or more rules.

13. The computer program product according to claim 8, wherein the one or more actions comprise isolating the first entity device from the entity network until the first entity device meets the one or more rules.

14. The computer program product according to claim 8, wherein the non-transitory computer-readable storage medium comprises computer-executable instructions for formulating the one or more rules based on entity policies, vulnerability information, exposure intelligence information, patch information, access information, and active directory information.

15. A computerized method for testing network and security devices to detect and mitigate vulnerabilities, the method comprising:

scanning an entity network to identify one or more entity devices associated with an entity, wherein the one or more entity devices comprise of security devices and network devices, wherein the security devices and the network devices comprise firewalls, antivirus, intrusion detection systems, unified threat management systems, network load balancers, network access control devices, wireless intrusion prevention and detection systems, web filters, spam filters, VPN gateways, email security gateways, proxy servers, content filtering devices, and network device backup and recovery systems;

identifying one or more rules for the one or more entity devices based on accessing data from one or more data repositories, wherein the one or more rules define one or more controls and security measures that the one or more entity devices require to function and to be a part of the entity network;

automatically generating one or more tests comprising executable portions of code based on the one or more rules;

performing the one or more tests on the one or more entity devices based on the one or more rules identified for the one or more entity devices;

determining that at least a first entity device of the one or more entity devices does not meet the one or more rules; and performing one or more actions to mitigate vulnerabilities associated with the first entity device not meeting the one or more rules.

16. The computerized method according to claim 15, wherein the one or more actions comprise:

generating enhanced monitoring functionalities to continuously monitor the first entity device;

executing the enhanced monitoring functionalities on the first entity device to enable enhanced monitoring on the first entity device; and continuously monitoring the first entity device, via the enhanced monitoring functionalities.

17. The computerized method according to claim 16, wherein the method further comprises monitoring inbound communications and outbound communications of the first entity device based on continuously monitoring the first entity device, via the enhanced monitoring functionalities.

18. The computerized method according to claim 17, wherein the method further comprises controlling the inbound communications and the outbound communications of the first entity device based on continuously monitoring the inbound communications and the outbound communications.

19. The computerized method according to claim 16, wherein the one or more actions further comprise:

transmitting information associated with the first entity device not meeting the one or more rules to the one or more third party entities;

identifying that the first entity device received one or more controls from the one or more third party entities, wherein the one or more controls are associated with the information transmitted to the one or more third party entities;

determining completion of execution of the one or more controls on the first entity device;

in response to determining the completion of execution of the one or more controls on the first entity device, reperforming the one or more tests on the first entity device to check for compliance;

determining that the one or more tests are successful and that the first entity device meets the one or more rules; and disabling the enhanced monitoring one the first entity device based on determining that the first entity device meets the one or more rules.

20. The computerized method according to claim 15, wherein the one or more actions comprise isolating the first entity device from the entity network until the first entity device meets the one or more rules.

* * * * *